(12) United States Patent
Campbell

(10) Patent No.: US 7,882,264 B2
(45) Date of Patent: *Feb. 1, 2011

(54) METHODS AND COMPUTER PROGRAM PRODUCTS FOR ROUTE DETERMINATION

(75) Inventor: Gary L. Campbell, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 738 days.

This patent is subject to a terminal disclaimer.

(21) Appl. No.: 11/769,816

(22) Filed: Jun. 28, 2007

(65) Prior Publication Data

US 2009/0003239 A1      Jan. 1, 2009

(51) Int. Cl.
*G06F 15/173* (2006.01)

(52) U.S. Cl. .................. 709/238; 709/205; 709/206

(58) Field of Classification Search .................. 709/238, 709/205, 206
See application file for complete search history.

(56) References Cited

U.S. PATENT DOCUMENTS

| 7,240,093 | B1* | 7/2007 | Danieli et al. ............... 709/205 |
| 2002/0178225 | A1* | 11/2002 | Madenberg et al. ......... 709/206 |

* cited by examiner

*Primary Examiner*—Tammy T Nguyen

(57) ABSTRACT

This application discloses methods and computer program products for optimal or at least improved routing by evaluating routing alternatives based on multiple-path elements. The systems and methods can determine the shortest route to network points while maintaining route diversity. As such, the systems and methods can determine diverse routes with network-entrance diversity or diverse routes entering a network through a common access point.

17 Claims, 7 Drawing Sheets

Swap if ((Total Route Distance 355 < Total Route Distance 325) AND ((Total Route Distance 325 − Total Route Distance 355) > (Access Distance 330 − Access Distance 300)) AND (Access Distance 330 < (Access Distance 300 + 50 miles)))

| LOCATION INFORMATION | | | | |
|---|---|---|---|---|
| NPANXX | LATA | ST | CO | CLLI |
| 817375 | 552 | TX | | FTWOTXARDSO |

| 1st ROUTE CHOICE | | | | | | | | | | | | | |
|---|---|---|---|---|---|---|---|---|---|---|---|---|---|
| ACCESS NODE | WC MI | ST | CITY | NOTE | EGRESS NODE | MILES | ST | CITY | NOTE | DESTINATION NODE | MILES | ST | CITY | TOTAL MILES |
| NRC | 16.5 | TX | IRVING | CPA | NRC | 0.0 | TX | IRVING | CPA | IRNG.IAE | 0.0 | TX IRVING | 16.5 |

| 2nd ROUTE CHOICE | | | | | | | | | | | | | |
|---|---|---|---|---|---|---|---|---|---|---|---|---|---|
| ACCESS NODE | WC MI | ST | CITY | NOTE | EGRESS NODE | MILES | ST | CITY | NOTE | DESTINATION NODE | MILES | ST | CITY | TOTAL MILES |
| 6L9 | 224.2 | TX | HOUSTON | CPA | CPZ | 701.7 | GA | ATLANTA | CPA | ATLN.PP2 | 1.0 | GA ATLANTA | 926.9 |

| 3rd ROUTE CHOICE | | | | | | | | | | | | | |
|---|---|---|---|---|---|---|---|---|---|---|---|---|---|
| ACCESS NODE | WC MI | ST | CITY | NOTE | EGRESS NODE | MILES | ST | CITY | NOTE | DESTINATION NODE | MILES | ST | CITY | TOTAL MILES |
| XBY | 1461.4 | MO | KANSAS CITY | CPA | 111P | 394.5 | IL | WESTMONT | CPA | DWGV.DNG | 4.1 | IL DOWNERS GROVE | 860.0 |

Fig. 5

| LOCATION INFORMATION | | | | |
|---|---|---|---|---|
| NPANXX | LATA | ST | CO | CLLI |
| 402493 | 644 | NE | | OMAHNEFODSO |

| 1st ROUTE CHOICE | | | | | | | | | | | | | | |
|---|---|---|---|---|---|---|---|---|---|---|---|---|---|---|
| ACCESS NODE | WC MI | ST | CITY | NOTE | EGRESS NODE | MILES | ST | CITY | NOTE | DESTINATION NODE | MILES | ST | CITY | TOTAL MILES |
| XBY | 171.2 | MO | KANSAS CITY | CPA | 111P | 394.5 | IL | WESTMONT | CPA | DWGV.DNG | 4.1 | IL | DOWNERS GROVE | 569.8 |

| 2nd ROUTE CHOICE | | | | | | | | | | | | | | |
|---|---|---|---|---|---|---|---|---|---|---|---|---|---|---|
| ACCESS NODE | WC MI | ST | CITY | NOTE | EGRESS NODE | MILES | ST | CITY | NOTE | DESTINATION NODE | MILES | ST | CITY | TOTAL MILES |
| 511 | 288.9 | MN | MINNEAPOLIS | CPA | RVC | 353.9 | IL | CHICAGO | CPA | RVDL.PP2 | 15.7 | IL | RIVERDALE | 658.5 |

| 3rd ROUTE CHOICE | | | | | | | | | | | | | | |
|---|---|---|---|---|---|---|---|---|---|---|---|---|---|---|
| ACCESS NODE | WC MI | ST | CITY | NOTE | EGRESS NODE | MILES | ST | CITY | NOTE | DESTINATION NODE | MILES | ST | CITY | TOTAL MILES |
| 2KZ | 363.0 | MO | SAINT LOUIS | CPA | CPZ | 464.6 | GA | ATLANTA | CPA | ATLN.PP2 | 1.0 | GA | ATLANTA | 828.6 |

Fig. 6

METHODS AND COMPUTER PROGRAM PRODUCTS FOR ROUTE DETERMINATION

BACKGROUND

As the Internet increased in popularity, the number of data services and customer devices exploded. For conventional voice-service providers this meant that the time-domain-multiplexed (TDM) networks were no longer optimal for the data services they now desired to carry. These difficulties led to the Converged Packet Architecture (CPA) network. The CPA network leveraged the economics of Ethernet and broke the traditional tie between Layer 1 transport circuits and Layer 2 protocols. The CPA network also simplified the customer premises equipment by combining all services onto a single packet access connection to the customer via an Ethernet interface. The CPA network was deployed using a multi-stage approach. The first stage included providing Ethernet access to Internet Dedicated Ethernet (IDE) hubs (public Internet access using Ethernet connections) and to Private IP (PIP) hubs.

Because the CPA network was limited in the number of possible CPA nodes with only some of the nodes having direct PIP and IDE connectivity, obtaining route diversity while minimizing the overall access distance required creative routing across the CPA network. Ideally, minimizing the overall access distance would require a simple least-distance calculation. However, because of the limited number of CPA nodes, their limited connectivity, and a 400-mile access limit a simple least-distance algorithm was unsuitable for this topology. Therefore, network providers and others with customers or potential customers in various locations needed a solution to provide optimal or at least improved routing in the CPA network while maintaining diversity. Thus, along with the CPA network, the need arose for a homing model designed to provide optimal or at least improved access to PIP and IDE hubs in the early stages of the CPA network.

BRIEF DESCRIPTION OF THE DRAWINGS

FIG. 5 shows a sample output from the homing model of an exemplary embodiment.

FIG. 6 shows another sample output from the homing model of an exemplary embodiment.

DETAILED DESCRIPTION

Figure 1:
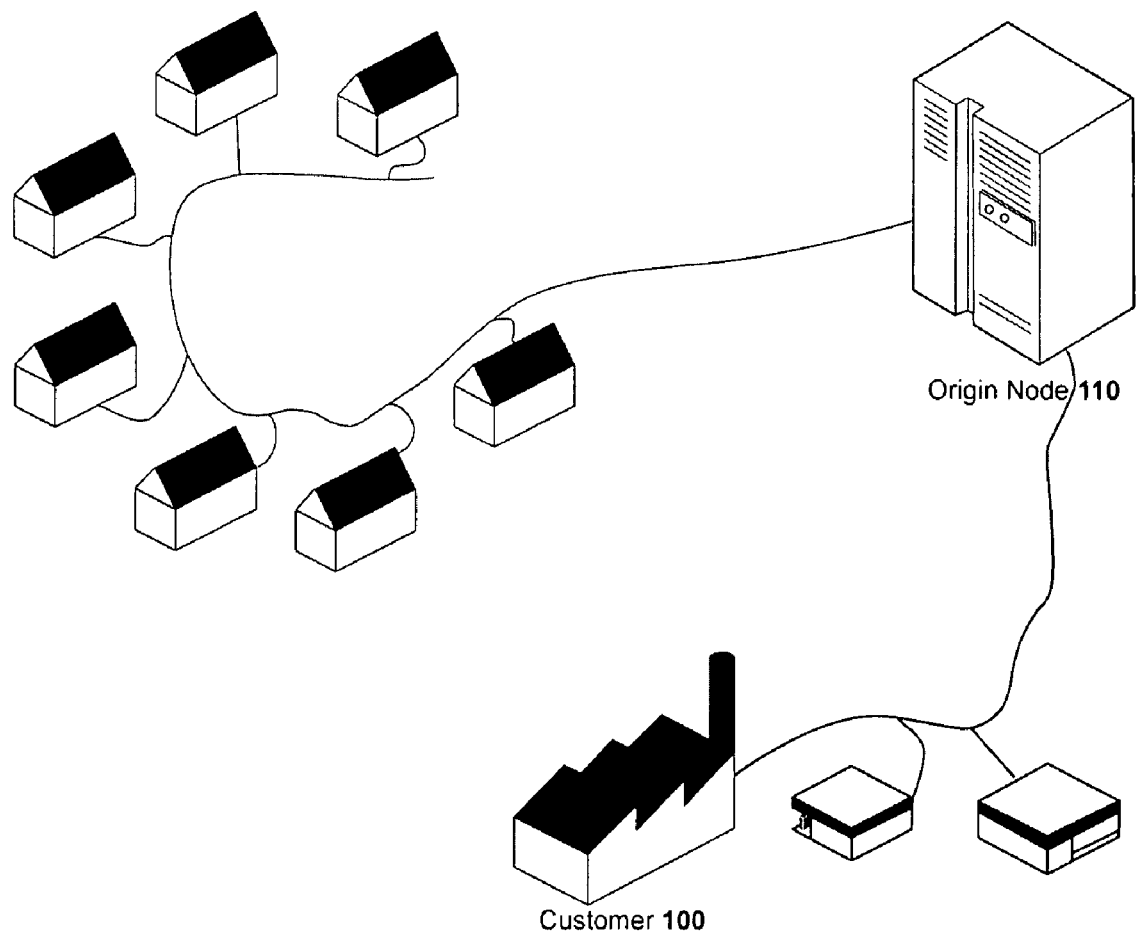
FIG. 1 shows an overview of multiple customers connecting to an origin node.

Exemplary embodiments may minimize or at least reduce the negative impact and concerns associated with a limited-node network by evaluating routing alternatives based on multiple-path elements. In this regard, the concerns for route diversity in a CPA network 400 are exacerbated because there are only a fixed number of nodes in a CPA network 400 and not all nodes have the same connectivity. For example, not all nodes in the CPA network 400 have PIP connectivity. The PIP connectivity allows a customers' employees to communicate across a private Internet Protocol backbone, using current ATM and frame relay connections. Thus, PIP traffic must be routed through CPA nodes with PIP connectivity. Because of the limited number of CPA nodes and their limited connectivity, typical least-distance models for routing are not well suited for CPA networks. However, exemplary embodiments provide a homing model 10 for optimal or at least improved routing that is better suited for CPA and other limited node networks.

To achieve improved routing, the systems and methods of the exemplary embodiments consider multiple-path elements in determining a route. For example, some of the multiple-path elements that can be considered include the access distance to the network, the backhaul distance across the network, and the egress distance to the final destination. In essence, the exemplary embodiments provide a mechanism for determining the shortest route to network points while maintaining route diversity. This route diversity can include route diversity with network-entrance diversity or route diversity entering the network through a common access point.

Moreover, it should be understood that the exemplary embodiments are not limited to determining routes exclusively in a CPA network 400. Rather, they can be implemented in almost any application for determining the shortest distance to a particular point while maintaining route diversity irrespective of the underlying platform.

Furthermore, it should be recognized that the various embodiments may be implemented as, for example, methods, data processing systems, or computer program products. That is, the embodiments may take the form of an entirely hardware embodiment, an entirely software embodiment, or an embodiment combining both software and hardware aspects. In fact, the implementations may take the form of a computer program product on a computer-readable storage medium having computer-readable program instructions (e.g., computer software) embodied in a storage medium such as hard disks, CD-ROMs, optical storage devices, or magnetic storage devices.

In the various embodiments, the term "node" is referenced. A node may be any of a number of devices or components designed to communicate via a communications network. For example, a node may be a repeater, hub, switch, router, bridge, modem, cable modem termination system, mainframe, private branch exchange, arithmetic logic unit, Internet-Dedicated-Ethernet unit, PPI unit, base station transceiver, wire center, base station controller, gateway support node, packet data serving node, handheld electronic device, cellular phone, PDA, receiver, transmitter, server, network-to-network interface, digital subscriber line access multiplexer, aggregator, host, gateway, dumb terminal, smart terminal, desktop computer, laptop computer, point of presence, or any other processing device that facilitates network communication. Furthermore, each node may be configured to communicate with one or more other nodes. The nodes typically communicate using a communications controller to communicate with external communication networks. The external communication networks may interface with the communications controller using a wired data transmission protocol such as X.25, ISDN, DSL, PIP, Ethernet, ATM, frame relay, DOCSIS, or any other wired transmission protocol. Additionally, the node may be configured to communicate with other nodes via wireless external communication networks using a wireless protocol such as 802.11, 802.15.4, or standard 3 G, CDMA2000 1x EV-DO, GPRS, W-CDMA, or any other wireless protocol.

Figure 7:
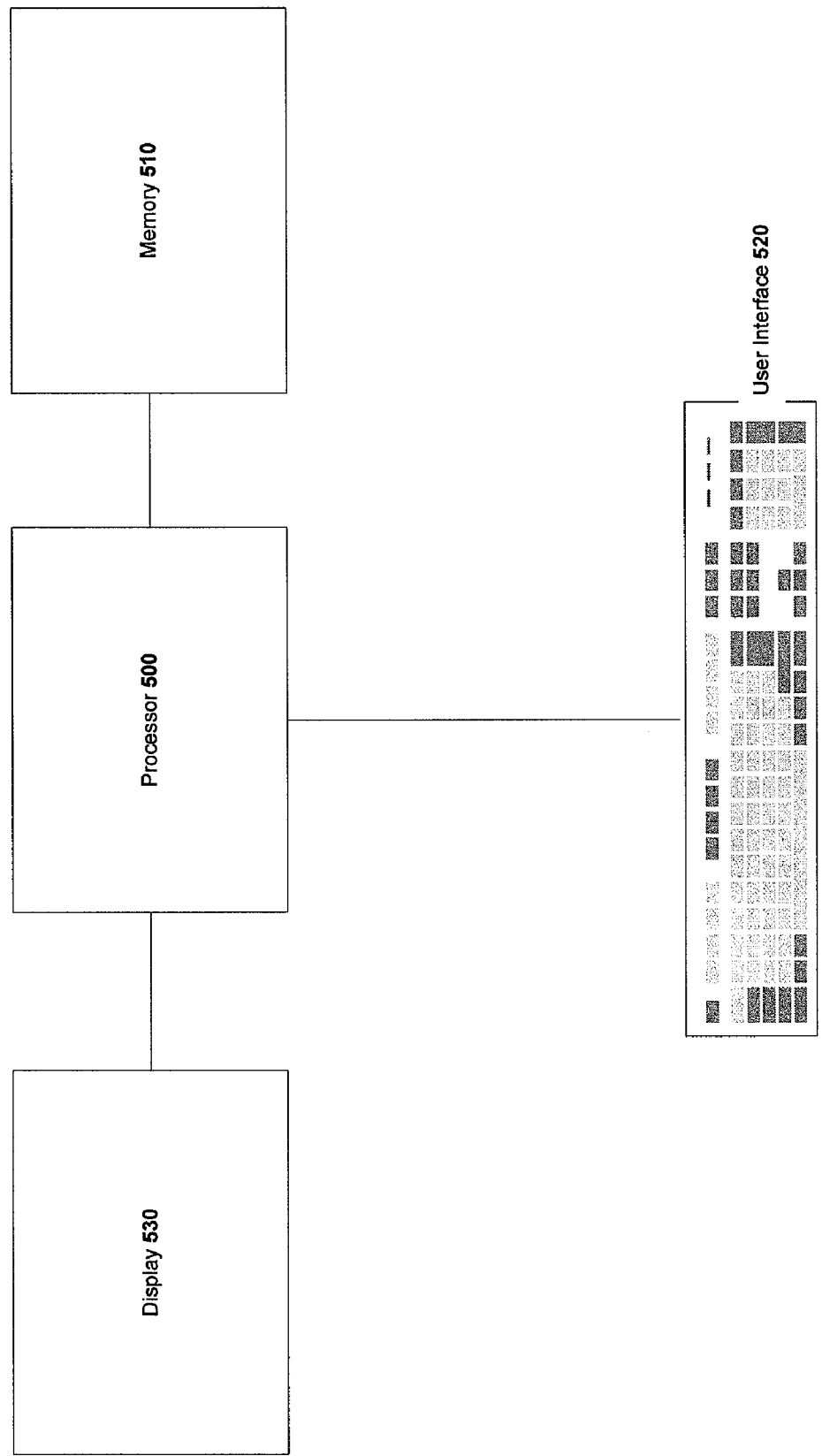
FIG. 7 shows a hardware implementation of an exemplary embodiment of the homing model.

In one embodiment, as shown in FIG. 7, the homing model is implemented on a processor 500, such as a computing device, that is configured to perform the functions described in conjunction with the homing model. For example, the apparatus may include a memory device 510 in communication with the processor for storing a homing model application configured to be executed by the processor to perform the functions of the homing model. Additionally, the apparatus can connect to a user interface 520, such as a keyboard, mouse, or touchscreen for receiving user input and a display 530 for providing output, which output may also be stored in memory if desired.

The various embodiments described below in conjunction with the CPA network 400 determine the least-distance, least-latency routing options. However, as should be understood, the various embodiments can be applied to most any other need for determining routing options. These various embodiments will now be described with reference to the accompanying drawings, in which the exemplary embodiments and examples are shown. Like numbers refer to like elements throughout.

Figure 2:
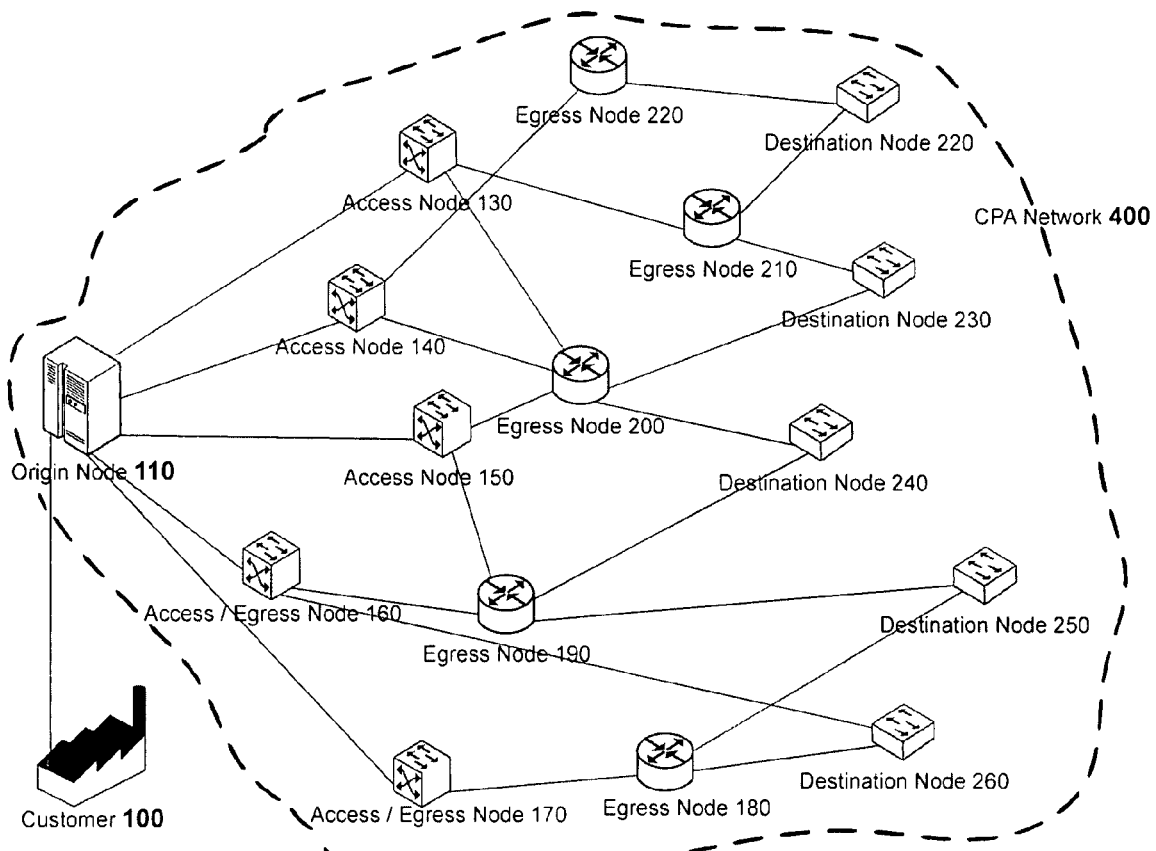
FIG. 2 shows an exemplary CPA network, which is illustrative, but not necessarily topologically accurate.

FIG. 1 shows an overview of multiple customers connecting to an origin node, which is part of a CPA network 400. FIG. 2 shows an overview of an exemplary CPA network 400, which may not be topologically accurate, but is provided for the purpose of illustration to explain the routing functionality of the various embodiments of the homing model 10. With respect to a CPA network 400, the routing typically begins at a wire center (origin node 110). The origin node 110 may be a local telephone company office providing service to a given customer location. That is, the origin node 110 of this embodiment may be the nearest point to a customer location for which a location, such as vertical and horizontal coordinates, can be obtained. However, the exemplary embodiments are not limited to this context and can be adapted to route in any network. From the origin node 110, traffic is first routed to an access node 130, 140, 150, 160, 170. In the CPA network 400, access nodes 130, 140, 150, 160, 170 are generally point of presence locations, i.e., access points to the rest of the network. From the access node 130, 140, 150, 160, 170, traffic is routed to an egress node 180, 190, 200, 210, 220 with the desired egress connectivity, such as PIP or IDE connectivity. An egress node may be a CPA node that has a specific egress connectivity via a network-to-network interface (NNI). In other words, an egress node may have an NNI with PIP connectivity, IDE connectivity, both, or some other desired egress connectivity. Typically, not all nodes in a CPA network 400 have the same connectivity. Again, an egress node can be considered as any node in which egress is desired. Moreover, it is entirely possible that a given access node 160, 170 can have the desired egress connectivity and be considered as an egress node. This, of course, would not necessarily require routing to a distinct egress node 180, 190, 200, 210, 220 with the desired egress connectivity because they could be one in the same.

The egress node has the ability to communicate with a destination node. A destination node can be any node in a network and it should be noted that the term destination node does not necessarily connote that it is the endpoint for the data traffic. It can, however, be used to indicate that the destination node is the end point for the route determination in at least some of the embodiments. For instance, in one embodiment a destination node is a node that is a PIP node or an IDE hub.

Once the route to the egress node 160, 170, 180, 190, 200, 210, 220 with the desired egress connectivity has been established, tolerance factors may be included. These tolerance factors could cause the embodiments of the homing model 10 to modify routes or to alter the order of route choices as is discussed later in greater detail.

Figure 3:
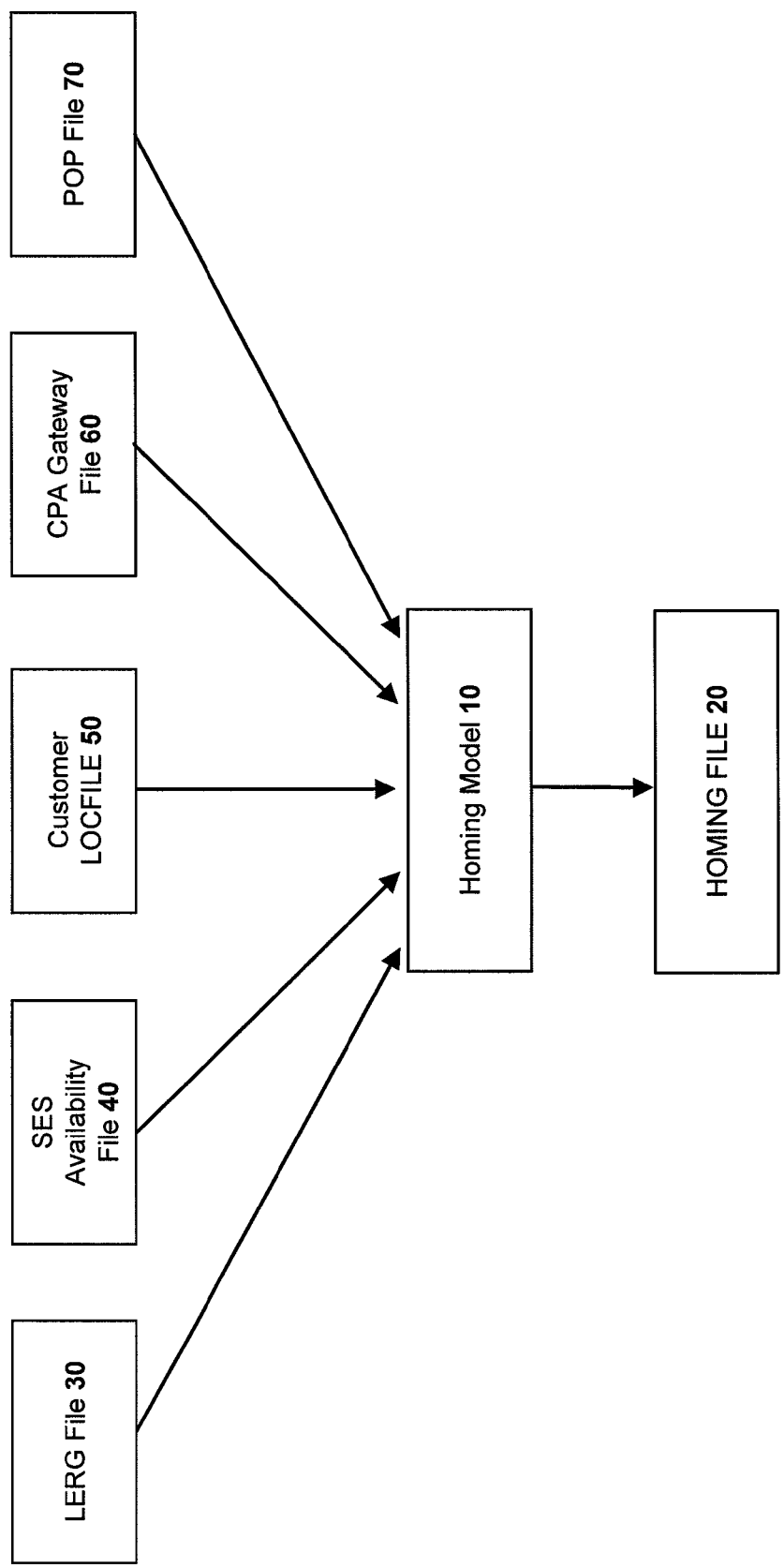
FIG. 3 illustrates inputs of a homing model of an exemplary embodiment.

FIG. 3 shows an overview of exemplary inputs (LERG File 30, SES Availability File 40, Customer LOCFILE 50, CPA Gateway File 60, and POP File 70) into one embodiment of the homing model 10. As previously mentioned, the homing model's 10 input can vary for each embodiment and is only dependent upon the system in which the embodiments of the homing model 10 are run. For example, in a CPA network 400, the pertinent input information may come from a LERG File 30, SES Availability File 40, Customer LOCFILE 50, CPA Gateway File 60, and POP File 70.

The LERG file 30 typically contains information relating to a particular source location: country code assignments; NPA assignments; LATA codes; destination codes (NPANXX); rate details; operating company numbers; access tandem codes; switching entity record details; and switch homing arrangements. The SES (switched Ethernet service) Availability File usually contains information relating to the high speed data services available via the network and information relating to the available end offices (central offices where user lines and trunks are interconnected). The Customer LOCFILE 50 provides any needed information regarding a specific customer (each customer typically has at least one Customer LOCFILE, but depending on the services provided, a customer may have more than one Customer LOCFILE 50). The CPA Gateway File 60 contains information concerning all 31 CPA gateways (or additional gateways in some embodiments). Essentially, the CPA Gateway File provides part of the topology of the CPA network 400. And lastly, the POP File 70 provides information about the various point-of-presence locations providing access to the CPA network 400. In sum, the input files contain information regarding the topology of the CPA network 400 and the capabilities, location, and connectivity of each node.

The information from these input files is used by the embodiments of the homing model 10 to make routing determinations. These routing determinations are not simple least-distance calculations because each node in the CPA network 400 does not have connectivity for every provided service. Again, the input received by the homing model 10 embodiments can be adapted to the network being analyzed, e.g., source address, destination address, next hop, and interface address. Once the input is received, the information is processed. In processing the information, the homing model 10 can provide completely diverse routes with network-entrance diversity or diverse routes entering the network through a common access point.

In one embodiment, the homing model 10 provides route diversity without network-entrance diversity. The diversity provided can be logical diversity or physical diversity depending on the network and inputs. In other words, the homing model of this embodiment can provide diverse routes that enter the network through a common access node 130, 140, 150, 160, 170. In this embodiment, the homing model 10 locates or homes to the access node 130, 140, 150, 160, 170 nearest in terms of distance to the origin node 110. The homing model 10 then evaluates the access node 130, 140, 150, 160, 170 to determine if it has the desired egress connectivity so as to be used as an egress node. If it could be used as an egress node, the homing model 10 indicates it as such. For example, if the homing model 10 homed to access node 160, it would evaluate access node 160, such as it being the nearest node to origin node 110, to determine if it could be used as an egress node; and, if it could, the homing model 10 would then indicate it as an egress node 160 and the route as the first route choice. That is, the homing model 10 would not search for an egress node that is distinct from the access node 160 because access node 160 has the desired egress connectivity. However, once the homing model 10 indicates that access node 160 has been used as an egress node 160, it will not be used again as an egress node so as to assure route diversity.

On the other hand, if the homing model 10 homed to access node 140, such as it being the nearest node to origin node 110, it would determine if access node 140 could be used as an egress node. Since access node 140 does not have the desired egress connectivity, the homing model 10 would determine that access node 140 cannot be used as an egress node. Thus, the homing model 10 would home to a node with the desired egress connectivity that has not been used previously as an egress node, indicate it as an egress node, and indicate the route as the first route choice. In this embodiment, once a node is used as an egress node, it will not be used again as an egress node so as to ensure route diversity.

After the homing model 10 has determined the first route choice, it homes to a second node that has the desired egress requirements and has not been used previously as an egress node, indicates the second node as an egress node, and indicates the route as the second route choice. Then, the homing model 10 homes to a third node that has the desired egress requirements and has not been used previously as an egress node, indicates the third node as an egress node, and indicates the route as the third route choice. The second, third, and following nodes to which the homing model 10 homes are egress nodes. Typically, the homing model 10 homes to the nearest node with the desired egress connectivity that has not been used previously as an egress node. This process can be repeated as many or as few times as needed based on the number of routes desired. In one embodiment, the homing model 10 provides three route choices. The route choices can be output (printed, transmitted, stored, displayed, or otherwise communicated) to the user. FIGS. 5 and 6 show a sample output from the homing model 10. Thus, the homing model 10 establishes the routes through a common access node and distinct egress nodes thereby achieving route diversity with a common access point.

As previously mentioned, the homing model 10 and the related methodologies can be implemented as a method, apparatus, or computer program product. In one embodiment of the present invention, a system implements the homing model 10 as a module: a route choice provider module. The route choice provider module is configured to at least perform the functions previously described.

In another embodiment, the homing model 10 provides a fixed number of diverse routes while also providing network-entrance diversity. The diversity provided can be logical diversity or physical diversity depending on the network and inputs. Providing network-entrance diversity can be helpful for many reasons. For instance, if a large segment of a customer's routes are homed through a single access node, it could cripple a customer's network if the access node were to fail. Therefore, by providing route diversity and network-entrance diversity, the effects of node failure can be minimized.

The number of diverse routes provided by this embodiment can vary depending on the network and the fixed number of output routes desired. In one embodiment, the homing model determines at least four route choices. Determining the fixed number of diverse routes is performed via an iterative or repeating step wherein the step can be repeated the number of times equal to the fixed number of diverse routes desired.

The first step in this embodiment is homing to an access node that has not been used previously as an access point to the network. By homing to an access node that has not been used as an access node before, the homing model 10 provides diverse network entrances.

As referenced in FIG. 2, the homing model 10 then determines if the access node can be used as an egress node. For instance, if the homing model 10 homed to access node 160, it would be indicated as egress node 160 and as the first route choice because it has the desired egress connectivity. As previously mentioned, the desired egress connectivity can be any connectivity, such as PIP or IDE connectivity. However, if the homing model 10 homed to access node 140, it would determine if access node 140 could be used as an egress node. Since access node 140 does not have the desired egress connectivity, it could not be used as an egress node. Thus, the homing model 10 would then home from the access node to an appropriate node having the desired egress connectivity that has not been used previously as an egress node, indicate it as an egress node, and indicate the route as the first route choice. Once a node is used as an egress node, it will not be used again as an egress node. Similarly, once the homing model 10 uses a node as an access node, it will not use the same node as an access node again. That is, the single use limitation applies to both access nodes and egress nodes.

The next step in this embodiment uses a first heuristic to allow the user to implement real-world considerations by allowing a trade-off of controlled increases in the access distance (distance from the origin node to the access node of a given route) for elimination of an egress node and its associated backhaul distance (distance from the access node to the egress node of a given route). For example, if the distance from the origin node to the egress node of a route choice is less than ten miles more than the distance from the origin node to the access node, the homing model 10 eliminates the access node from the route and directly homes to the egress node. The number of miles used in the trade-off is determined by a first tolerance factor that can be modified by the user. In other words, if the conditions of the first heuristic are met, implementation of the first heuristic will usually result in a route choice with slightly greater access miles but fewer total miles.

In one implementation, the model determines if the distance from the origin node to the egress node is less than the sum of a first tolerance factor and the distance from the origin node to the access node. The first tolerance factor is typically a predefined distance. If the distance from the origin node to the egress node is less than the sum of the first tolerance factor and the distance from the origin node to the access node, the homing model 10 eliminates the access node from the route, indicates the access node as not having been previously used, and indicates the egress node as the route choice. If, however, the distance from the origin node to the egress node is greater than or equal to the sum of the first tolerance factor and the distance from the origin node to the access node, the homing model 10 maintains the route choice. That is, it maintains the access node as an element of the route. In one embodiment, the first tolerance factor is ten miles, but this tolerance factor can be changed as desired. This is repeated with respect to each route choice.

The route choices, in one embodiment, are indicated as corresponding to the iteration count. The iteration count increases after each iterative step is completed to indicate the route choice order. For instance, the value of the iteration count starts at one; thus, the initial route choice would be indicated as the first route choice. After each iterative step is completed, the value of the iteration count is increased by one. Accordingly, the route choice determined by the next iterative step would be indicated as the second route choice. The iterative step therefore determines the route choices and indicates the route choice order. After the iterative step determines the fixed number of route choices, the homing model 10 compares the route choices.

Figure 4:
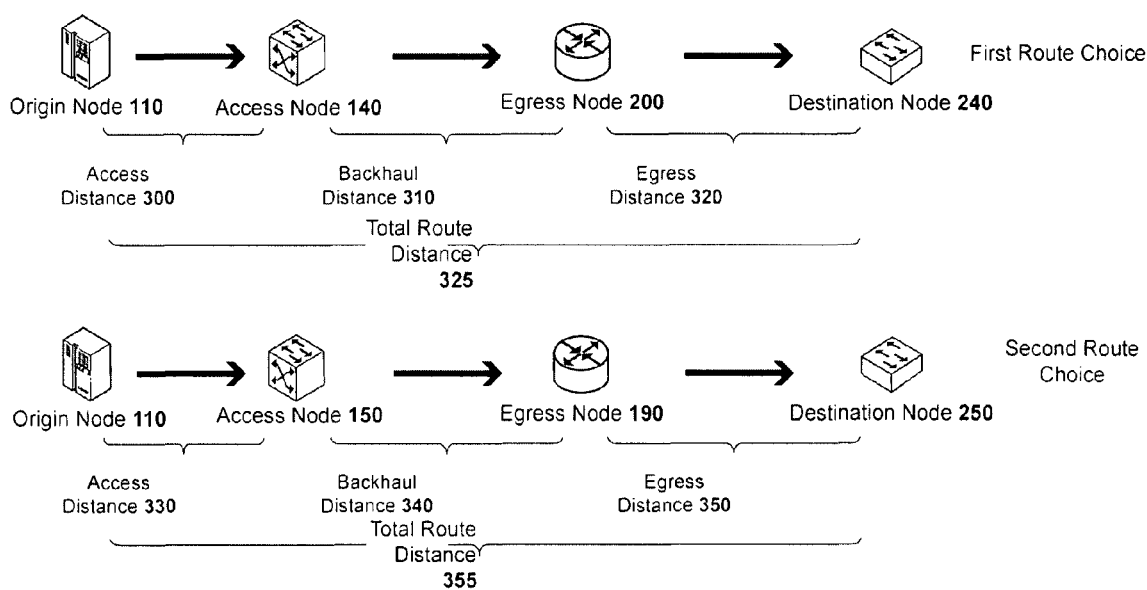
FIG. 4 shows the distances used by the homing model of an exemplary embodiment in making route choice comparisons.

Using a second heuristic, the homing model 10 determines if the order of the routes choices should be modified. Through the second heuristic, one embodiment determines if the order of the fixed number of routing choices should be modified by comparing the distances of each route choice. For example, as shown in FIG. 4, the homing model 10 determines the total route distance 325 for the first route choice by summing the access distance 300, the backhaul distance 310, and the egress distance 320. The access distance 300 is the distance from the origin node 110 to the access node 160. The backhaul distance 310 is the distance from the access node 140 to the egress node 200. And the egress distance is the distance from the egress node 200 to the destination node 240.

The homing model 10 then determines the total route distance 355 for a subsequent route choice, which in this case is the second route choice. As with the first route choice, the homing model 10 sums the access distance 330, the backhaul distance 340, and the egress distance 350. The access distance 330 is the distance from the origin node 110 to the access node 150. The backhaul distance 340 is the distance from the access node 150 to the egress node 190. And the egress distance is the distance from the egress node 190 to the destination node 250.

The homing model 10 then performs a swap function in accordance with one embodiment. The model compares two route choices at a time, such as the first route choice to the second route choice. The order of the routes will be swapped, making the first route choice the second route choice and the second route choice the first route choice, if specific conditions are satisfied. To make a swap, the conditions of one embodiment require the ((Total Route Distance 355<Total Route Distance 325) AND ((Total Route Distance 325−Total Route Distance 355)>(Access Distance 330−Access Distance 300)) AND (Access Distance 330<(Access Distance 300+a second tolerance factor))). That is, the swap function swaps the order of the routes if the total route distance of the subsequent route choice is less than the total route distance of the earlier route choice, and the total route distance of the subsequent route choice subtracted from the total route distance of the earlier route choice is greater than the access distance of the earlier route choice subtracted from the access distance of the subsequent route choice, and the access distance of the subsequent route choice is less than a sum of a second tolerance factor and the access distance of the earlier route choice. This swap function uses a second tolerance factor that is typically defined by the user.

The second tolerance factor is usually a predefined distance, e.g., 50 miles, to allow for this defined tradeoff. The second tolerance factor is similar to the first tolerance factor in that it allows the user to implement real-world considerations by allowing a trade-off of controlled increases in access distance. For example, the first heuristic allows a trade-off of controlled increases in access distance for elimination of an egress node and its associated backhaul distance. The second heuristic allows for a tradeoff of increased access distance for a lower total route distance under certain circumstances. After adding the total route distance for each route choice, the model determines if the order of the routes should be swapped. The second heuristic compares two routes at a time. The second heuristic will swap the order of the routes if the conditions previously described are met.

If each condition is satisfied, the homing model 10 swaps the order of the routes. This swap function continues by comparing the first route choice to the subsequent route choices. That is, the route choice that follows the route choice that was just compared. For instance, in one embodiment, the homing model 10 compares the distances of the first route choice to the distances of the second route choice, and then the distances of the first route choice to the distances of the third route choice. In another embodiment, the procedure compares each route choice to all other route choices subsequent to it. However, the comparison in the swap function does not need to be implemented to compare the first route choice with each subsequent route choice. It could, for example, compare only the first route choice with the second route choice or any other combination of route choices.

The route choices are then output (printed, transmitted, stored, displayed, or otherwise communicated) to the user. In one embodiment, after processing the information through the homing model 10, the three best route choices, or some other predefined number, are output to the user. FIGS. 5 and 6 show a sample output from the homing model 10.

As illustrated, the various embodiments mitigate the negative impact and concerns associated with a limited-node network wherein some of the nodes have limited connectivity. Although, the exemplary embodiments provide a homing model 10 for improved routing ideal for a CPA network 400, it should be understood that the embodiments are not limited to determining routes exclusively in a CPA network 400. Rather, they can be implemented in almost any application for determining the shortest distance to a particular point while maintaining route diversity irrespective of the underlying platform.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

That which is claimed:

1. A method comprising:
   homing, using a computer processor, to an access node that has not been previously used as an access node;
   determining if the access node has desired egress requirements;
   in response to determining that the access node has the desired egress requirements, indicating the access node as an egress node and indicating a route from an origin node to the access node as a route choice; and
   in response to determining that the access node does not have the desired egress requirements, homing to a second node that has the desired egress requirements and has not been previously used as an egress node, indicating the second node as an egress node, and indicating the route from the origin node to the access node to the egress node as the route choice; and
   determining if a distance from the origin node to the egress node is less than a sum of a first tolerance factor and a distance from the origin node to the access node;
   in response to determining that the distance from the origin node to the egress node is less than the sum of the first tolerance factor and the distance from the origin node to the access node, eliminating the access node from the route, indicating the access node as not having been previously used as an access node, and indicating the route from the origin node to the egress node, without inclusion of the access node, as the route choice;
   in response to determining that the distance from the origin node to the egress node is not less than the sum of the first tolerance factor and the distance from the origin node to the access node, maintaining the route choice.

2. The method of claim 1 wherein the first tolerance factor is a first predefined distance.

3. The method of claim 1 wherein the steps of homing, determining, and in response to determining are repeated to determine a plurality of route choices.

4. The method of claim 3 further comprising:
determining if an order of the route choices should be changed by comparing each route choice by summing an access distance from the origin node to the access node, a backhaul distance from the access node to the egress node, and an egress distance from the egress node to a destination node based upon a total route distance for each of the route choices.

5. The method of claim 4 wherein determining if an order of the route choices should be changed by comparing each route choice by summing an access distance from the origin node to the access node, a backhaul distance from the access node to the egress node, and an egress distance from the egress node to a destination node based upon a total route distance for each of the route choices further includes switching the order of the route choices if the total route distance of the subsequent route choice is less than the total route distance of the route choice, and the total route distance of the subsequent route choice subtracted from the total route distance of the route choice is greater than the access distance of the route choice subtracted from the access distance of the subsequent route choice, and the access distance of the subsequent route choice is less than a sum of a second tolerance factor and the access distance of the route choice.

6. The method of claim 5 wherein the second tolerance factor is a second predefined distance.

7. A method comprising:
homing, using a computer processor, to an access node;
determining if the access node has desired egress requirements and if the access node has been used previously as an egress node;
in response to determining that the access node has the desired egress requirements and that the access node has not been used previously as an egress node, indicating the access node as an egress node and indicating a route from an origin node to the access node as a route choice;
in response to determining that the access node does not have the desired egress requirements or that the access node has been used previously as an egress node, homing to a second node that has the desired egress requirements and has not been previously used as an egress node, indicating the second node as an egress node, and indicating the route from the origin node to the access node to the egress node as the route choice; and
determining if a distance from the origin node to the egress node is less than a sum of a first tolerance factor and a distance from the origin node to the access node;
in response to determining that the distance from the origin node to the egress node is less than the sum of the first tolerance factor and the distance from the origin node to the access node, eliminating the access node from the route, indicating the access node as not having been previously used as an access node, and indicating the route from the origin node to the egress node, without inclusion of the access node, as the route choice;
in response to determining that the distance from the origin node to the egress node is not less than the sum of the first tolerance factor and the distance from the origin node to the access node, maintaining the route choice.

8. The method of claim 7 wherein the steps of homing, determining, and in response to determining are repeated to determine a plurality of route choices.

9. A computer program product comprising a non-transitory computer-readable storage medium having computer-readable instructions stored therein, the computer-readable instructions comprising:
first instructions configured to home to an access node that has not been previously used as an access node;
second instructions configured to determine if the access node has desired egress requirements;
third instructions configured, in response to a determination that the access node has the desired egress requirements, to indicate the access node as an egress node and indicate a route from an origin node to the access node as a route choice;
fourth instructions configured, in response to a determination that the access node does not have the desired egress requirements, to home to a second node that has the desired egress requirements and has not been previously used as an egress node, indicate the second node as an egress node, and indicate the route from the origin node to the access node to the egress node as the route choice;
fifth instructions to determine if a distance from the origin node to the egress node is less than a sum of a first tolerance factor and a distance from the origin node to the access node;
sixth instructions configured, in response to a determination that the distance from the origin node to the egress node is less than the sum of the first tolerance factor and the distance from the origin node to the access node, to eliminate the access node from the route, indicate the access node as not having been previously used as an access node, and indicate the route from the origin node to the egress node, without inclusion of the access node, as the route choice; and
seventh instructions configured, in response to a determination that the distance from the origin node to the egress node is not less than the sum of the first tolerance factor and the distance from the origin node to the access node, to maintain the route choice.

10. The computer program product of claim 9 wherein the first tolerance factor is a first predefined distance.

11. The computer program product of claim 9 further comprising:
fifth instructions configured to repeat the first instructions, the second instructions, the third instructions, and the fourth instructions to determine a plurality of route choices.

12. The computer program product of claim 11 further comprising:
sixth instructions configured to determine if an order of the route choices should be changed by comparing each route choice by summing an access distance from the origin node to the access node, a backhaul distance from the access node to the egress node, and an egress distance from the egress node to a destination node based upon a total route distance for each of the route choices.

13. The computer program product of claim 12 wherein the sixth executable instructions further include instructions configured to switch the order of the route choices if the total route distance of the subsequent route choice is less than the total route distance of the route choice, and the total route distance of the subsequent route choice subtracted from the total route distance of the route choice is greater than the access distance of the route choice subtracted from the access distance of the subsequent route choice, and the access distance of the subsequent route choice is less than a sum of a second tolerance factor and the access distance of the route choice.

14. The computer program product of claim 13 wherein the second tolerance factor is a second predefined distance.

15. The computer program product of claim 14 further comprising:
    seventh instructions configured to output the order of the route choices.

16. A computer program product comprising a non-transitory computer-readable storage medium having computer-readable instructions stored therein, the computer-readable instructions comprising:
    first instructions configured to home to an access node;
    second instructions configured to determine if the access node has desired egress requirements and to determine if the access node has been used previously as an egress node;
    third instructions configured, in response to a determination that the access node has the desired egress requirements and that the access node has not been used previously as an egress node, to indicate the access node as an egress node and indicate a route from an origin node to the access node as a route choice;
    fourth instructions configured, in response to a determination that the access node does not have the desired egress requirements or that the access node has been used previously as an egress node, to home to a second node that has the desired egress requirements and has not been previously used as an egress node, indicate the second node as an egress node, and indicate the route from the origin node to the access node to the egress node as the route choice; and
    fifth instructions to determine if a distance from the origin node to the egress node is less than a sum of a first tolerance factor and a distance from the origin node to the access node;
    sixth instructions configured, in response to a determination that the distance from the origin node to the egress node is less than the sum of the first tolerance factor and the distance from the origin node to the access node, to eliminate the access node from the route, indicate the access node as not having been previously used as an access node, and indicate the route from the origin node to the egress node, without inclusion of the access node, as the route choice; and
    seventh instructions configured, in response to a determination that the distance from the origin node to the egress node is not less than the sum of the first tolerance factor and the distance from the origin node to the access node, to maintain the route choice.

17. The computer program product of claim 16 further comprising:
    fifth instructions configured to repeat the first instructions, the second instructions, the third instructions, and the fourth instructions to determine a plurality of route choices.

* * * * *